Dec. 24, 1940.    C. B. GRAY    2,226,241
METAL SHEARING TOOL
Filed May 25, 1938    2 Sheets-Sheet 1
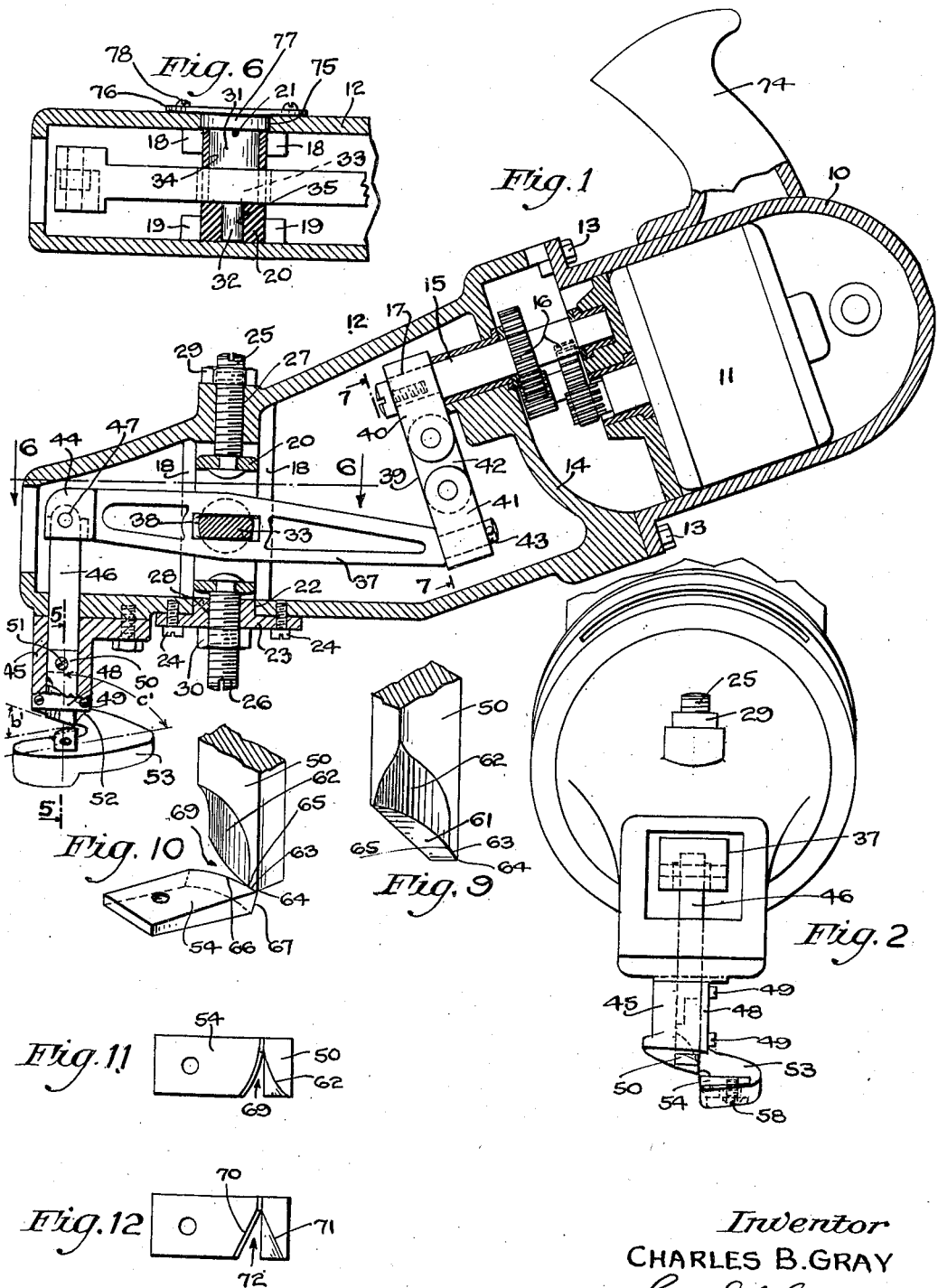
Inventor
CHARLES B. GRAY
By Leon Edelson
Attorney.

Dec. 24, 1940.　　　　C. B. GRAY　　　　2,226,241
METAL SHEARING TOOL
Filed May 25, 1938　　　　2 Sheets-Sheet 2
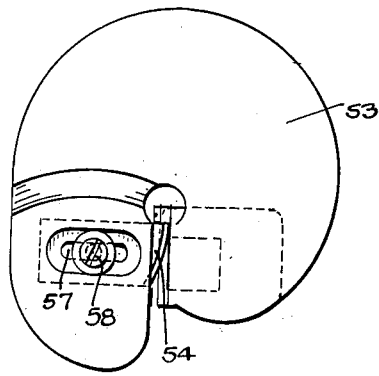
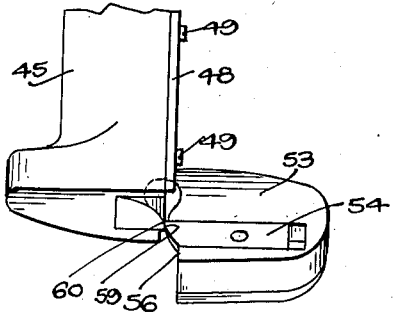
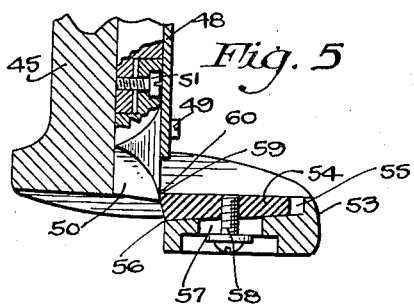
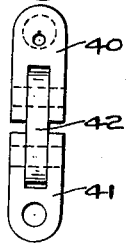
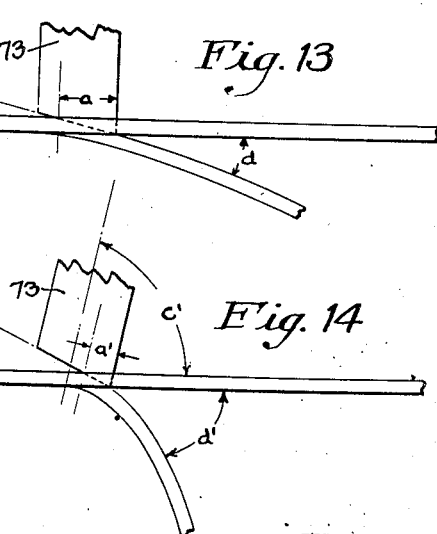
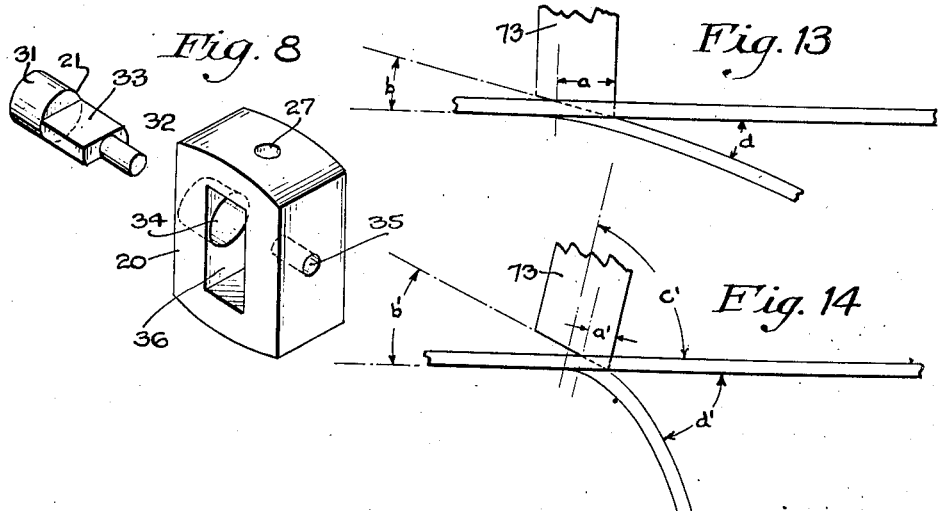
Inventor
CHARLES B. GRAY
By L. Earl Delano
Attorney.

Patented Dec. 24, 1940

2,226,241

UNITED STATES PATENT OFFICE 2,226,241

METAL SHEARING TOOL

Charles B. Gray, Millbourne, Pa.

Application May 25, 1938, Serial No. 209,913

11 Claims. (Cl. 30—228)

This invention relates generally to shears of the portable motor operated type and more particularly to an improved construction thereof having among its principal objects the provision of a shear of such design as to facilitate the cutting of suitable material, for example, sheet metal, in any desired direction not only along straight lines but also along curved lines of extremely short radii.

In accordance with the present invention, reciprocatory motion is imparted to a movably mounted shear blade by means of an oscillating beam located in the front end or nose of the shearing tool. By virtue of this construction, the front end of the tool may be so reduced in its cross-sectional overall dimensions that it may be inserted into places not possible with shearing tools as heretofore constructed, thereby rendering the tool capable of performing the shearing operations in locations heretofore considered inaccessible.

In addition to the foregoing, it is an object of the present invention to provide a shearing tool which is adapted to be held by hand during the operation thereof in a position most natural to the operator and to this end the grip by means of which the unit is held is so disposed with relation to the axis of the reciprocatory shearing element that the tool may be supported and operated without requiring the operator's arm to be held in other than a natural horizontal position, thus reducing very considerably the tiring strain which is imposed upon the operator's arm by the weight of the tool.

A further object is to so angularly relate the axis of the reciprocating shearing element to the plane of the stock being cut while supporting the tool with the arm of the operator extended in its natural horizontal position that a considerably increased spread of the stock may be obtained for a given stroke of the reciprocating shearing element than is otherwise possible. Stated conversely, the reciprocating shearing element is so angularly related to the plane of the stock being cut that the stroke of said shearing element may be very materially reduced and still provide the necessary spread of the stock along the line of the cut to facilitate proper and adequate feeding of the stock. By so increasing the spread of the stock as it is cut without increasing the stroke of the reciprocating shearing element, feeding of the stock relatively to the tool is accomplished without undue pressure and binding of the shearing elements.

It has been found that with a tool constructed in accordance with the present invention the stroke of the reciprocating shearing element need not be greater than the thickness of the stock to be cut in order to obtain the necessary spread of the stock to facilitate feeding thereof relatively to the shearing elements of the tool. By so limiting the extent to which the reciprocating shearing element penetrates the stock being cut, it becomes possible to more readily turn the tool with respect to the stock or the stock with respect to the tool to thereby sever the stock smoothly and with minimum effort along curved lines of exceedingly small radii.

Another object of the present invention is to provide a tool having the above operating characteristics and wherein means are provided for adjusting the extent to which the reciprocating shearing element penetrates the plane of the stock and in which means are further provided for readily effecting removal and replacement of the shearing element as desired.

Still another object is to provide an improved construction of cooperating shearing elements, the proximate extremities of said elements being relatively so designed and arranged as to facilitate the feeding and guiding of stock therethrough with minimum effort and binding pressure at the same time affording adequate clearance immediately to the rear of the shearing zone per se to insure free turning movement of the stock relatively to the shearing head or of the shearing head relatively to the stock.

Still another and important object of the present invention is to provide adequate means for securing in fixed position the stationary shearing element, the said means including provision for positionally adjusting said normally stationary shearing element relatively to its cooperating reciprocating shearing elements.

Other objects and advantages of the invention will be apparent more fully hereinafter, it being understood that the invention consists substantially in the combination, construction, location and relative arrangement of parts, all as will be described more fully hereinafter, as shown in the accompanying drawings and as finally pointed out in the appended claims.

In the drawings, wherein is illustrated a preferred construction of the tool of the present invention—

Figure 1 is a vertical cross-sectional view of the tool constructed in accordance with and embodying the principles of the present invention;

Figure 2 is an end elevational view of the tool;

Figure 3 is a bottom plan view of the shearing end of the tool;

Figure 4 is an enlarged end elevational view showing a portion of the shearing head of the tool;

Figure 5 is a vertical sectional view taken on the line 5—5 of Figure 1;

Figure 6 is a horizontal sectional view taken on the line 6—6 of Figure 1;

Figure 7 is a view taken on the lines 7—7 of Figure 1;

Figure 8 is a perspective view of the housing and bearing element for the oscillating bottom of the tool;

Figure 9 is a perspective view showing the lower extremity of the reciprocating shearing element;

Figure 10 is a perspective view showing the shearing elements in their proper related position;

Figure 11 is a bottom plan view of the shearing element as shown in Figure 10;

Figure 12 is a view similar to Figure 11 but showing a somewhat modified form of shearing elements; and Figures 13 and 14 are diagrammatic views illustrating a principle of operation of the present invention.

Referring now more particularly to the drawings, it will be observed that the tool of the present invention generally comprises a main casing or housing for the working parts thereof composed preferably of two main parts, namely, a part 10 in which is housed an electrically operated motor 11 and a part 12 in which is housed the operating gear of the unit, the parts 10 and 12 being secured in the assembled relation shown preferably by means of the bolts 13. The part 12 is of elongated form and of gradually diminishing cross-sectional dimension toward the frontal end thereof and is provided interiorly thereof with a web 14 having the dual function of sealing the motor and its reduction gearing from the operating gear of the tool and providing a support or bearing for the driven shaft 15 of the motor. This shaft 15 is driven by the motor 11 through suitable reduction gearing, designated generally by the reference numeral 16, located immediately to the rear of the partition 14, this driven shaft 15 being provided at its free outer extremity with an extension 17 in the form of an eccentric.

Also provided interiorly of the part 12 of the tool housing at a point substantially in advance of the web 14 are opposed pairs of ribs 18—18 and 19—19 respectively defining vertical guideways for receiving a mounting block 20 in which in turn is journalled a bearing pin 21. In order to facilitate the insertion of the mounting block 20 in position within the guides 18—18 and 19—19 of the tool housing, the latter is provided in the bottom thereof with an opening 22 (see Figure 1) of a size to permit the block 20 to be projected upwardly therethrough into the position shown in Figures 1 and 6. This opening 22 is adapted to be closed by a closure member 23 secured in position by the bolts 24. As most clearly appears in Figure 1, the mounting block 20 is provided at the top and bottom thereof with axially aligned adjusting screws 25 and 26 which respectively project through suitable openings 27 and 28 respectively provided in the top and bottom of the part 12. Respectively threaded upon these screws 25 and 26 are nuts 29 and 30, it being observed that by backing off one nut and correspondingly tightening the other, the mounting block may be adjusted axially of the aligned screws 25 and 26 within the guides 18—18 and 19—19.

The bearing pin 21 which is journalled within the mounting block 20 is of the form best shown in Figures 6 and 8 wherein it will be observed that it is provided at one end thereof with an enlarged bearing element 31 of circular cross-section and at the opposite end with a bearing element 32 also of circular cross-section but of considerably reduced diameter. The intermediate portion 33 of the bearing pin is flattened and of such cross-section that while in width it equals the diameter of the bearing element 31, in depth it equals the diameter of the opposed bearing element 32.

The mounting block 20 is provided in opposite walls thereof with circular openings 34 and 35 respectively adapted to receive the bearing elements 31 and 32 of the bearing pin, which latter is adapted to be disposed in journalled position within the block by projecting it axially through the bore 34 in the block so that the bearing element 32 rests in the bore 35 while the bearing element 31 rests in the bore 34 of the mounting block. The mounting block is centrally cut out to provide an enlarged opening 36 within which is disposed the flattened intermediate portion 33 of the bearing pin, it being understood that when the pin 21 is properly positioned in the mounting block 20 and the latter is in turn disposed within the tool housing part 12, the opposite walls of the latter serve to prevent axial displacement of the pin from the mounting block yet the pin is free to oscillate about its axis.

Operatively associated with the bearing pin is an elongated beam 37 which is adapted to be projected through the central opening 36 of the mounting block 20 and is provided in the approximate central portion thereof with a transverse opening 38 adapted to be traversed by the flattened intermediate portion 33 of the bearing pin (see Figures 1 and 6). The transverse opening 38 in the beam 37 is of somewhat greater width than the width of the intermediate portion 33 of the bearing pin upon which the beam is supported and preferably the beam is of an overall width to more or less snugly fit between the side walls of the opening 36 in the mounting block to thereby restrain the beam from any movement except that partaking of a combined oscillatory and shifting movement in its own plane, the shifting movement being, of course, in the direction of the length of the beam within the limits permitted by its central slot or opening 38 and the flattened intermediate portion 33 of the bearing pin traversing said slot. In order to facilitate assembly of the beam and its associated supporting element, the housing 12 is provided in one wall thereof with an opening 75 of a size sufficient to permit the bearing pin 21 to be projected freely therethrough and into the position shown in Figure 6 wherein it traverses the slot 38 of the beam 37. This opening 75 is adapted to be closed by a retaining plate 76 having a boss 77 on one side thereof a size and depth to snugly fit the opening and provide a smooth surface against which the flat end of the enlarged portion 31 of the bearing pin may engage. This plate 76 is retained against displacement by the securing bolts or screws 78.

The rear end of the walking beam 37 is connected by a link assembly 39 to the eccentric 17 provided at the outer extremity of the driven shaft 15 of the motor. This link assembly 39 is composed of the three elements 40, 41 and 42 most clearly shown in Figures 1 and 7, it being noted that the opposite extremities of the outer link members 40 and 41 are respectively loosely journalled in any suitable manner to the eccentric 17 and to an extension 43 provided at the rear end of the walking beam. From the foregoing, it will be apparent that upon rotation of the driven shaft 15 of the motor, its eccentric 17 will impart a reciprocatory motion to the link assembly 39 which in turn will cause the walking beam 37 to oscillate about the axis of the bearing pin 21, thereby causing the forward extremity 44 of the walking beam to raise and lower for each revolution of the driven shaft 15.

As appears most clearly in Figure 1, it will be observed that the housing 12 in which is disposed the walking beam 37 and its associated parts is so shaped that the forward portion thereof is angularly related in a vertical plane to the rear portion thereof, the rear portion of the housing being in substantial axial alignment with the motor housing part 10. In consequence of this design of the housing part 12, the rear part of the tool is upwardly and rearwardly inclined with respect to the front part of the tool. By virtue of this construction, the tool may be so maintained, as will appear more clearly hereinafter, that its rear end will impose no interference with the work when the latter is being cut while maintained in a substantial horizontal plane. Actually, the upwardly inclined rearward portion of the tool will extend substantially parallel to the plane of the material being cut and to the plane of the upper surface of the work supporting element of the tool hereinafter described and referred to as the work deflector.

Secured to the under side of the tool housing part 12 at the forward extremity thereof is a guide block 45 for a reciprocating shearing element 46, the upper extremity of which latter is pivotally secured, as at 47, to the forward extremity 44 of the walking beam. The guide block 45 insures a rectilinear reciprocation of the shearing element 46, this rectilinear motion being permitted due to the combined oscillating and rectilinearly shifting motion of the walking beam during actuation thereof. The guide block 45 is preferably formed by slotting one side thereof to form an elongated groove of a cross-section adapted to snugly accommodate the reciprocating shearing element 46. The open side of this groove is covered by a removable plate 48 (see Figures 1 and 6) which is secured in position by the bolts 49 and which may be removed as desired to afford access to the lower end of the shearing element 46 for purposes of inspection, repair and replacement of parts. Preferably, the shearing element 46 is provided with a replaceable or renewable shearing extremity 50 (see Figure 5) which is secured to the upper reciprocating part of the tool by means of a bolt 51. For a purpose which will be apparent hereinafter, the guide block 45 for the shearing element 46 is under-cut, as at 52 (see Figure 1), this undercut being extended from a point immediately adjacent the shearing edge of the tool to a point located well in back of the tool.

Secured to the guide block 45 as a separate element or formed as an integral part thereof, which latter expedient is considered to be the more preferable, is a spirally shaped deflector 53 constructed and arranged to provide for the passage of one sheared portion of material above the upper plane thereof and the other portion below said plane, while permitting the work to be turned through a short radius relatively to the shearing head of the tool. This deflector 53 serves as the support for a fixed shearing blade 54, it being observed, as best shown in Figures 1 to 5, that the upper surface of the deflector is provided with a groove 55 therein of gradually increasing depth toward the inner extremity 56 thereof to accommodate a fixed shearing blade 54 of correspondingly increasing depth longitudinally thereof. The deflector is provided with an elongated slot 57 in registry with the blade receiving groove 55 to permit the projection therethrough of a securing bolt or screw 58 the shank of which is upwardly threaded into the base of the shearing blade 54 to secure it fixedly in position. By loosening this screw 58, the blade 54 may be adjusted longitudinally within the slot 55 to present the shearing edge 59 of the tool toward or away from the corresponding shearing edge 60 of the reciprocating shearing element 46. Adjustable positionment of the fixed shearing blade with respect to the reciprocating shearing blade is thus readily accomplished and the securing means provided for maintaining the stationary blade 54 in fixed position is adequate to prevent any displacement thereof due to stresses and strains imposed thereon during the shearing operation. Inasmuch as the force tending to displace the stationary shearing blade is directed longitudinally thereof in a direction outwardly from the shearing edge of this blade, it will be apparent that in the present construction any such exerted force would only tend to wedge the blade more securely in position.

The shearing head of the reciprocating element 46 is of the form most clearly shown in Figures 9, 10 and 11 wherein it will be observed that the lower end 61 of the reciprocating blade is of a planar form and is disposed in a plane forming an acute angle with the horizontal when the reciprocating blade is held in vertical position. Also, one corner of the reciprocating shearing element at the lower extremity thereof, as at 62, is cut away and rounded so as to provide an effective shearing edge 63 extending between the points 64 and 65 (see Figures 9 and 10).

The stationary shearing blade 54 is arcuately shaped at its inner extremity, as at 66, and is under-cut or tapered, as at 67, to provide a sharp upper shearing edge adapted to coact with the shearing edge 63 of the reciprocating shearing blade. The arcuated proximate edges of the coacting shearing blades of the tool provide in effect a two-dimensional V-shaped opening 69 therebetween immediately in advance of their coacting shearing edges thereby affording ample space within which to feed the stock to and between said coacting shearing edges. While this divergent relation is preferably obtained by arcuately shaping the adjacent edges of the coacting shearing blades in the manner shown in Figures 9 to 11, the same effect may be accomplished by cutting or grinding away the outer adjacent corners of the coacting shearing blades along straight lines 70 and 71, as shown in Figure 12, to provide a two-dimensional diverging entrance space 72 which is the functional equivalent of the material entering space 69 in the arrangement of Figure 10.

The relief afforded by the divergent edges of the shearing blades provide the further important advantage that when the work is to be cut along curved lines in either direction, only a minimum amount of the shearing blades act upon the stock to shear it, thereby reducing any tendency for the blades to bind in the stock. For example, if a cut is to be made along a curved line extending in counterclockwise direction about the reciprocating shearing blade, the flared edge of the fixed blade, as represented by the curved edge 66 of Figure 10, provides ample space immediately to the rear of the shearing zone per se in which the stock may be swung in order to readily follow the curved line of the cut. On the other hand, if the cut is to be made along a line curving in the opposite direction, that is, clockwise about the fixed shearing blade, the relief afforded by the cut-away portion 62 of the reciprocating blade prevents interference between the stock and the reciprocating blade while following the curved line of cut.

As clearly appears in Figures 1, 2, 4 and 5, the deflector 53 springs from one side of the depending guide 45 for the reciprocating shearing element and thence curves rearwardly thereof about the reciprocating axis of the upper shearing element so that its free extremity terminates at the side of the guide member 45 opposite to that from which it originally sprung. Also, the deflector member 53 is downwardly and outwardly inclined from the point where it springs from or joins the guide 45 for the reciprocating shearing element. In consequence of this, the upper surface of the stationary shearing blade 54 lies in a plane inclined with respect to the reciprocating axis of the movable shearing blade. Accordingly, as a sheet of material is fed into the diverging entrance space 69 provided between the movable and stationary shearing elements, one portion thereof to one side of the line of the cut will rest flatwise upon the downwardly and outwardly inclined surface of the deflector 53 in which is mounted the stationary shearing blade 54, while the remaining severed portion of the sheet disposed to the opposite side of the line of the cut will pass beneath that portion of the deflector which immediately adjoins and springs from the depending guide member 45 and is deflected thereby angularly with respect to the feeding plane of the material being cut.

As appears most clearly in Figure 1, the upper surface of the freely extending outer extremity of the deflector 53 is so angularly related with respect to the lower planar end surface 61 of the reciprocating shearing element as to form an acute angle $b'$ in a vertical plane of substantial degree, while the longitudinal axis of the reciprocating shearing element approaches the plane of the material being cut at an angle $c'$ (see Figures 1 and 14). The importance of this angular relation of the reciprocating shearing blade to the plane of the material being cut is best appreciated by a consideration of Figures 13 and 14. In both Figures 13 and 14, the reciprocating shearing blade is diagrammatically represented by the reference numeral 73, the tool being identical in both figures. In Figure 13, however, the tool is shown reciprocated along a line extending perpendicularly to the plane of the material being cut and consequently to the upper plane surface of the free outer extremity of the deflector 53, it being assumed, of course, that during the operation of shearing the material it is maintained in flatwise engagement with the upper surface of the deflector 53. It will be observed that when the reciprocating shearing blade 73 of Figure 13 penetrates the material being cut to the extent of its thickness and by a motion extending perpendicularly to the plane of the material, the length $a$ of the material is necessarily engaged by the shearing blade, the bottom plane or surface of the shearing blade forming an acute angle $b$ with the plane of the work. Under these conditions, the severed portions of the stock are separated or spread apart to the extent designated by the angle $d$.

Referring now to Figure 14, it will be observed that when the same tool 73 is projected into the stock so that the angle $c'$ is less than ninety degrees, as was the case in Figure 13, for the same stroke of the tool, i. e., the stroke equalling the thickness of the stock, the angle $b'$ is considerably greater than the angle $b$ while the extent of penetration of the tool in the stock, as indicated by $a'$, is very materially reduced when compared to the extent of penetration, designated by $a$ in Figure 13. In consequence of the angular relation of the tool with respect to the plane of the stock, as shown in Figure 14, the separation of the severed portions of the stock is very materially increased, the angle $d'$ being much greater than the angle $d$, yet the length of stroke of the reciprocating tool is in both cases the same. Therefore, by so angularly relating the tool to the plane of the feeding stock for a given length of stroke of the reciprocating shearing blade, a greater degree of separation is obtained between the severed portions of the stock with considerably reduced effort, a lesser extent of the shearing edge of the reciprocating blade being required to penetrate the stock.

Further, due to the angular relation of the reciprocating shearing blade and the plane of the material being cut, only a relatively small portion of the blade penetrates the stock for a given stroke in consequence of which there is less tendency for the blade to bind in the stock. This results not only in a cleaner and smoother cut and easier feeding and guiding of the stock along the predetermined line of the cut, but it also makes possible the cutting of the stock along curves of extremely small radii. Obviously, with an extent of penetration of the tool 73 in the stock as indicated in Figure 14, the stock may be more sharply turned relatively to the tool than is possible with the extent of tool penetration in the stock as shown in Figure 13. In order that the fullest advantage may be taken of this feature of the present invention, the guide block 45 is undercut, as at 52, so that upon rotating the work relatively to the blade 73 (see Figure 14) the line of the cut may approach very closely the back vertical edge of the blade per se, thereby permitting a cut to be made along a curved line having a radius less than the thickness of the guide block 45 when the cut is being made in a counter-clockwise direction as viewed in Figure 1. When, however, the cut is made in a clockwise direction, the radius of the curved cut, due to the small penetration of the blade into the stock, may be much smaller.

It is a decided advantage in the operation of the tool of the present invention that it be so held by the operator that the reciprocating shearing blade operates along a line angularly related with respect to the plane of the material being cut. This means then that the tool in order to be most advantageously operated should be so held that the upper plane surface of the outer free extremity of the deflector 53 lies substantially in a horizontal plane, assuming, of course, that the material being cut is also disposed in that plane. In order to so hold the tool in the proper position aforesaid, the handle 74 of the construction shown in Figure 1 is mounted upon the top of the motor housing part 10, this handle or grip being so angularly related to the tool that when most conveniently grasped by the hand of the operator while the latter's arm is extended in natural horizontal position the tool is automatically held in proper working position, with minimum tiring effort imposed upon the arm of the operator.

As appears most clearly in Figure 1, the handle 74 is secured to the top of the motor housing part 10 and at such point above the motor 11 that when the handle is grasped by the operator's hand the principal weight of the tool is immediately supported thereby. Also, it will be observed that the handle 74 extends upwardly and is so angularly related with respect to the longitudinal axis of the motor housing part 10 to which it is secured that the grip thereof when grasped by the hand of the operator while being maintained in natural pushing position, automatically tends to maintain the tool with the upper surface of the deflector 53 in a plane substantially paralleling the operator's extended arm. The advantage of this location of the handle relatively to the tool proper becomes immediately apparent when it is observed that when the shearing head is advanced into the material being cut the severed part of the latter which overlies the upper surface of the deflector may be extended in its original plane without any interference whatsoever by the rear part of the tool.

In the tool of the present construction it is a very simple matter should it be desired to increase or decrease the extent of penetration of the reciprocating shearing element into the stock to make the necessary adjustment therefor. This is accomplished simply by raising or lowering the mounting block 20 by tightening one or the other of the nuts 29 and 30 upon its operatively associated screw 25 or 26 while correspondingly loosening the other nut. Also, the stationary shearing element may be adjusted toward or away from the reciprocating shearing element to compensate for wear by the means heretofore described.

Another important advantage of the present tool results from the compact design thereof at the outer or shearing end of the tool, this compactness in design being obtained by the use of the walking beam for imparting reciprocatory movement to the upper shearing blade from the rotating driven shaft of the motor. It will be observed that the overall depth of the shearing head of the tool is very materially reduced by reason of the fact that in the present tool the nose thereof need be only large enough to accommodate the upper end of the reciprocating shearing blade and the forward end of the walking beam and to permit the necessary reciprocating movement of these connecting parts.

It will be understood, of course, that the invention is susceptible of various changes and modifications which may be made from time to time without departing from the general principles or real spirit of the invention as disclosed and, accordingly, it is intended to claim the invention broadly and specifically as indicated by the appended claims.

What is claimed as new and useful is:

1. In a power-driven shear for cutting sheet material, in combination, a housing for the operating gear of the shear, operating gear disposed within said housing said gear including a driving motor having an eccentric driven shaft, an oscillating beam and a link assembly intervening said eccentric shaft and the rear extremity of said beam whereby oscillatory movement is imparted to the latter upon rotation of said eccentric shaft, a reciprocating shearing blade pivotally connected to the forward extremity of said beam, and a fixed shearing blade carried by the housing exteriorly thereof for coaction with said reciprocating blade, an oscillatably journalled bearing pin traversing said beam and supporting the same at a point intermediate its opposite extremities, and coacting means in said beam and bearing pin for permitting longitudinal shifting of the beam relatively to said pin.

2. In a power-driven shear for cutting sheet material, in combination, a housing for the operating gear of the shear, operating gear disposed within said housing said gear including a driving motor having an eccentric driven shaft, an oscillating beam and a link assembly intervening said eccentric shaft and the rear extremity of said beam whereby oscillatory movement is imparted to the latter upon rotation of said eccentric shaft, a reciprocating shearing blade pivotally connected to the forward extremity of said beam, and a fixed shearing blade carried by the housing exteriorly thereof for coaction with said reciprocating blade, an oscillatably journalled bearing pin traversing said beam and supporting the same at a point intermediate its opposite extremities, said bearing pin having a flattened portion and said beam having a transverse slot within which said flattened portion is received, said slot being of somewhat greater length than the width of said flattened portion of the bearing pin whereby to permit longitudinal shifting of said beam relatively to said pin during oscillatory movement of said beam and bearing pin about the axis of the latter.

3. In a power-driven shear for cutting sheet material, in combination, a housing for the operating gear of the shear, operating gear disposed within said housing said gear including a driving motor having an eccentric driven shaft, an oscillating beam and a link assembly intervening said shaft and the rear extremity of said beam for imparting oscillatory movement to the beam upon rotation of said eccentric shaft, a transverse bearing pin for the beam traversing the latter at a point located intermediate its opposite ends, and a positionally adjustable mounting block within said housing having laterally spaced bearings for the opposite ends of said bearing pin.

4. In a power-driven shear for cutting sheet material, in combination, a housing for the operating gear of the shear, operating gear disposed within said housing said gear including a driving motor having an eccentric driven shaft, an oscillating beam and a link assembly intervening said shaft and the rear extremity of said beam for imparting oscillatory movement to the beam upon rotation of said eccentric shaft, a transverse bearing pin for the beam traversing the latter at a point located intermediate its opposite ends, and a mounting block within said housing having laterally spaced bearings for the opposite ends of said bearing pin, and means for shifting said mounting block in the plane of the bearing pin axis whereby to elevate or depress said bearing pin and, accordingly, positionally adjust the axis about which said beam is oscillatable.

5. In a power-driven shear for cutting sheet material, in combination, a housing for the operating gear of the shear, operating gear disposed within said housing said gear including a driving motor having an eccentric driven shaft, an oscillating beam and a link assembly intervening said shaft and the rear extremity of said beam for imparting oscillatory movement to the beam upon rotation of said eccentric shaft, a transverse bearing pin for the beam traversing the latter at a point located intermediate its opposite ends, a positionally adjustable mounting block within said housing having laterally spaced bearings for the opposite ends of said bearing pin, the portion of said block between the bearings therein being provided with an opening through which is projected said beam and across which extends the bearing pin for said beam, a fixed shearing blade supported from the housing at a point exterior and to one side of the frontal end of the housing, and a reciprocable shearing blade arranged in shearing relation to said fixed blade and having one end connected to the forward extremity of said beam.

6. In a power-driven shear for cutting sheet material, in combination, a housing for the operating gear of the shear, operating gear disposed within said housing said gear including a driving motor having an eccentric driven shaft, an oscillating beam and a link assembly intervening said shaft and the rear extremity of said beam for imparting oscillatory movement to the beam upon rotation of said eccentric shaft, a transverse bearing pin for the beam traversing the latter at a point located intermediate its opposite ends, a mounting block within said housing having laterally spaced bearings for the opposite ends of said bearing pin, a fixed shearing blade supported from the housing at a point exterior and to one side of the frontal end of the housing, a reciprocable shearing blade arranged in shearing relation to said fixed blade and having one end connected to the forward extremity of said beam, and means for positionally adjusting the oscillating axis of said beam whereby to vary the extent of penetration of the reciprocating shearing blade with respect to the plane of the material being sheared.

7. In a power-driven portable shear for cutting sheet material, in combination, a housing for the operating gear of the shear operating gear disposed within said housing, a guide block for a reciprocating shearing blade depending from the frontal extremity of said housing, a deflector for the material being sheared springing rearwardly and to one side of said depending guide block, the upper surface of said deflector being inclined downwardly and laterally toward its free outer side edge, a fixed shearing blade adjustably secured in flush relation in said inclined upper surface of the work deflector, a reciprocating shearing blade operatively disposed within said guide block and arranged in shearing relation to the fixed blade, an oscillating beam disposed within said housing and having its forward extremity connected to the inner end of said reciprocating blade, mounting means for the beam for imparting thereto a combined oscillatory and longitudinal shifting movement with respect to its oscillatory axis, and means for positionally adjusting the oscillatory axis of said beam to change the shearing relation of the shearing blades.

8. In a power-driven portable shear for cutting sheet material, in combination, a pair of coacting shear blades one of which is arranged for reciprocation along a rectilinearly extending axis and the other of which is stationarily mounted with its upper surface flush with the plane along which the material to be cut is fed, said rectilinear axis of the reciprocating blade being so angularly related to the said material feeding planes that the reciprocating blade penetrates the material angularly with respect to the plane thereof, the bottom end surface of said reciprocating blade being ground to a plane which is upwardly inclined with respect to said feeding plane in directions extending both longitudinally and laterally of the line of cut of the material the proximate ends of said shear blades being respectively ground to provide coacting shearing edges in the inner corner portions thereof and a two-dimensional diverging entrance space between the opposite outer corners thereof.

9. In a power-driven portable shear for cutting sheet material, in combination, a pair of coacting shear blades one of which is rectilinearly reciprocable and the other of which is stationary, the shearing end of the reciprocable blade being ground to provide in one corner thereof a sharp cutting edge which lies in a plane inclined with respect to the feeding plane of the material in directions extending both longitudinally and laterally of the line along which the material is to be cut, the inner edge of said stationary blade being ground to provide a sharp cutting edge in one corner portion thereof, the remainder of said edge being ground away to provide in conjunction with the ground shearing end of the reciprocating blade a two-dimensional flaring entrance space into which the material to be cut may be fed.

10. In a power-driven portable shear, in combination, a pair of shear blades one of which is rectilinearly reciprocable and the other of which is stationary, the proximate ends of the blades being respectively ground to provide coacting shearing edges in the inner corner portions thereof and a diverging entrance space between the opposite outer corner portions thereof, the outer corner portion of the reciprocable blade being flared upwardly and laterally of the cutting edge of the stationary blade and the outer corner portion of the stationary blade being flared downwardly and laterally of the cutting edge of the reciprocable blade.

11. In a power-driven portable shear for cutting sheet material, in combination, a housing for the operating gear of the shear, a guide block depending from the frontal end of the housing, a rectilinearly reciprocable shearing blade operatively disposed in said block and adapted to be reciprocated by the said operating gear, and a stationary shear blade operatively associated with said reciprocable shear blade, said guide block for the latter blade being undercut in the lower edge thereof and in the immediate zone of the coacting portions of said shear blades to thereby decrease the turning radius of the material relatively to the shearing axis of the shear.

CHARLES B. GRAY.